US006240385B1

(12) United States Patent
Foodeei

(10) Patent No.: US 6,240,385 B1
(45) Date of Patent: May 29, 2001

(54) METHODS AND APPARATUS FOR EFFICIENT QUANTIZATION OF GAIN PARAMETERS IN GLPAS SPEECH CODERS

(75) Inventor: Majid Foodeei, Montreal (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/161,429

(22) Filed: Sep. 24, 1998

(30) Foreign Application Priority Data

May 29, 1998 (CA) .................................................. 2239294

(51) Int. Cl.[7] ...................................................... G01L 19/04
(52) U.S. Cl. ........................... 704/220; 704/219; 704/222
(58) Field of Search .................................... 704/220, 225, 704/230, 222, 219, 502, 500, 262, 266, 268

(56) References Cited

U.S. PATENT DOCUMENTS 5,297,170 * 3/1994 Eyuboglu et al. .................. 375/242
5,388,124 * 2/1995 Larola et al. .......................... 375/17
5,633,980 * 5/1997 Ozawa ................................ 704/222
5,666,465 * 9/1997 Ozawa ................................ 704/222

* cited by examiner

*Primary Examiner*—Richemond Dorvil

(57) ABSTRACT

In methods and apparatus for encoding a gain parameter in a generalized linear predictive analysis-by-synthesis (GLPAS) coder, a subframe gain parameter is determined for each of a plurality of successive subframes of a frame, and a quantized frame gain parameter is determined for each frame using a delayed decision quantizer operating on the subframe gain parameters. The subframe gain parameters may be treated as components of a gain vector and the gain vector may be vector quantized to determine the quantized frame gain parameter. Encoder parameters are efficiently aligned with decoder parameters to ensure proper end-to-end operation. Alternatively, tree quantization or trellis quantization may be applied to the subframe gain parameters to determine the quantized frame gain parameter. The methods and apparatus are particularly applicable to low bit rate speech coding.

25 Claims, 13 Drawing Sheets

METHODS AND APPARATUS FOR EFFICIENT QUANTIZATION OF GAIN PARAMETERS IN GLPAS SPEECH CODERS

FIELD OF INVENTION

The present invention relates to quantization of gain parameters in speech coders and is particularly relevant to Generalized Linear Prediction Analysis-by-Synthesis (GLPAS) speech coders.

BACKGROUND OF INVENTION

A major objective in designing digital speech coders is to optimize tradeoffs between minimizing the bit rate of the encoded speech and maximizing the speech quality. Other practical criteria, such as complexity, delay and robustness, also impose constraints on coder design. Optimization of the tradeoffs must be tailored to the particular application to which the coder is to be applied.

Waveform approximating coders and decoders rely on relatively simple speech models and on limitations of the human hearing system to encode and reconstruct waveforms which are perceived to be very similar to the original speech signal prior to encoding. Over the past decade, the performance of Generalized Linear Prediction Analysis-by-Synthesis (GLPAS) speech coders providing coded speech at 2 kbps to 16 kbps has improved considerably. Nevertheless, further effort is devoted to increasing the speech quality of such coders and or the reduction of bit rate for equivalent speech quality.

A GLPAS coder commonly operates on successive frames of a speech signal in a closed-loop fashion, each frame comprising a plurality of successive subframes. Processing at the subframe level provides better modelling of signal changes while meeting practical constraints on processing complexity and memory usage, and the closed-loop nature of the processing further improves the efficiency of the coding.

Typical GLPAS coding techniques comprise:

Linear Predictive Coding (LPC) analysis to model the spectral envelope of the speech signal, providing partial short term prediction of speech signal parameters;

Pitch Delay prediction or Adaptive CodeBook (ACB) alignment to model pitch harmonics of the speech signal;

Pitch or ACB Gain determination to model the energy of harmonic components of the speech signal;

Fixed CodeBook (FCB) alignment to model excitation parameters of the speech signal;

FCB Gain determination to model the energy of wide spectrum components of the speech signal; and pre- and post-processing of the speech signal.

GLPAS techniques provide better solutions than LPAS techniques to efficient coding of the pitch by modifying the input signal to allow infrequent pitch updates without degrading performance. This speech signal modification may then be considered part of pre-processing with the modified signal being the input to the modelling and quantization process. In this specification, LPAS is considered to be a special case of GLPAS in which the modification of the signal to simplify pitch encoding is omitted.

One example of a GLPAS coder is the "North American Enhanced Variable Rate Codec" specified by Standard IS-127. This codec uses 20 msec frames, each frame comprising 3 successive subframes. The bit budget for each 20 msec frame when this coded is operating in "half rate mode" allows 22 bits per frame for Line Spectral Pairs (LSP) derived by LPC analysis, 7 bits per frame for Pitch Delay or ACB index, 3 bits per subframe (i.e. 9 bits per frame) for ACB Gain, 10 bits per subframe (i.e. 30 bits per frame) for FCB index, and 4 bits per subframe (i.e. 12 bits per frame) for FCB Gain, for a total of 80 bits per frame. The Pitch Gain or ACB Gain is determined for each subframe and converted into a 3 bit code for each subframe using scalar quantization. The FCB gain is also determined for each subframe and converted into a 4 bit code for each subframe using scalar quantization.

An example of a recent LPAS coder is the "Enhanced Full Rate Speech Codec for North American Cellular" defined by Standard IS-641. This codec uses 20 msec frames, each frame comprising 4 successive subframes. The bit budget for each 20 msec frame allows 26 bits per frame for Line Spectral Pairs (LSP) derived by LPC analysis, 26 bits per frame for Pitch Delay or ACB index, 17 bits per subframe (i.e. 68 bits per frame) for FCB index, and 7 bits per subframe (i.e. 28 bits per frame) for FCB and Pitch or ACB Gain, for a total of 148 bits per frame. The 26 bits per frame for Pitch Delay or ACB index are provided as 8 bits for each of the first and third subframes of each frame, and 5 bits for each of the second and fourth subframes of each frame. The Pitch Gain or ACB Gain for each subframe and the FCB gain for each subframe are determined for each subframe and converted into a 7 bit code for each subframe using two dimensional vector quantization, one component of the two dimensional gain vector for each subframe corresponding to the pitch gain for the subframe and the other component of the gain vector for each subframe corresponding to the FCB gain for the subframe.

The coders defined by IS-127 and IS-641 represent recent standards in GLPAS and LPAS speech coding techniques.

SUMMARY OF INVENTION

An object of this invention is to provide methods and apparatus for GLPAS speech coding which are more efficient than known GLPAS speech coding methods and apparatus as represented, for example, by the IS-127 and IS-641 specifications, for at least for some applications.

Another object of this invention is to provide efficient gain quantization in GLPAS encoders.

In this specification, the term "vector quantization" includes, but is not limited to, recursive vector quantization, such as analysis-by-synthesis vector quantization.

One aspect of this invention provides a method of encoding a gain parameter in a generalized linear predictive analysis-by-synthesis coder. The method comprises determining a subframe gain parameter for each of a plurality of successive subframes of a frame, and determining a quantized frame gain parameter for each frame using a delayed decision quantizer operating on the subframe gain parameters.

The step of determining a quantized frame gain parameter may comprise treating the subframe gain parameters as components of a gain vector and vector quantizing the gain vector to determine the quantized frame gain parameter. Alternatively, the step of determining a quantized frame gain parameter may comprise applying tree quantization or trellis quantization to the subframe gain parameters.

The step of vector quantizing the gain vector may comprise quantizing the gain vector by analysis-by-synthesis linear predictive vector quantization. The vector quantization technique may comprise adaptive linear vector quantization, for example moving average predictive vector quantization, auto-regressive predictive vector quantization, or a combination of two or more of these techniques.

The method may comprise determining multiple subframe gain parameters for each subframe, treating the subframe gain parameters as components of a gain vector and vector quantizing the gain vector to determine the quantized frame gain parameter. For example, the method may comprise determining a fixed codebook gain and an adaptive codebook gain or pitch gain for each subframe, treating the fixed codebook gains and adaptive codebook or pitch gains as components of a gain vector and vector quantizing the gain vector to determine the quantized gain parameter.

The method may further comprise updating parameters of the coder using the quantized frame gain parameter. This prevents parameters of the coder derived from the unquantized gain (for example Adaptive Codebook parameters) from becoming misaligned with corresponding parameters of a decoder based on the quantized gain, such that the decoder cannot accurately reconstruct the original signal from the encoded signal.

Another aspect of the invention provides a generalized linear predictive analysis-by-synthesis coder for encoding a speech signal. The coder comprises means for encoding a gain parameter comprising means for determining a subframe gain parameter for each of a plurality of successive subframes of a frame, and delayed decision quantization means operable on the subframe gain parameters for determining a quantized frame gain parameter for each frame.

The delayed decision quantization means may comprise a vector quantizer which treats the subframe gain parameters as components of a gain vector, vector quantizing the gain vector to determine the quantized frame gain parameter. Alternatively, the delayed decision quantization means may comprise a tree quantizer or a trellis quantizer.

The methods of encoding and the encoders defined above exploit temporal redundancy of gains across successive subframes of the signal to be encoded to improve coding efficiency. Some of the methods of encoding and encoders defined above provide additional coding efficiency by employing analysis-by-synthesis linear predictive coding of the gains.

Another aspect of the invention provides a transmission system, comprising an analysis-by-synthesis linear predictive coder, a decoder and a transmission medium linking the coder to the decoder. The coder comprises means for encoding a gain parameter, said means comprising means for determining a subframe gain parameter for each of a plurality of successive subframes of a frame. The coder further comprises delayed decision quantization means operable on the subframe gain parameters for determining a quantized frame gain parameter for each frame. The decoder comprises means for determining a quantized gain vector for the current frame from a received gain vector codebook index, and means for applying respective components of the quantized gain vector to successive subframes of a signal synthesized at the decoder.

Yet another aspect of the invention provides a method of decoding a signal having a vector quantized gain parameter, components of a quantized gain vector for a frame corresponding to gain parameters for successive subframes of the frame. The method comprises determining a quantized gain vector for the current frame from a received gain vector codebook index, and applying respective components of the quantized gain vector to successive subframes of a signal synthesized at the decoder.

Yet another aspect of the invention provides a decoder for decoding a signal having a vector quantized gain parameter, components of a quantized gain vector for a frame corresponding to gain parameters for successive subframes of the frame. The decoder comprises means for determining a quantized gain vector for the current frame from a received gain vector codebook index, and means for applying respective components of the quantized gain vector to successive subframes of a signal synthesized at the decoder.

BRIEF DESCRIPTION OF DRAWINGS

Embodiments of the invention are described below by way of example only with reference to accompanying drawings, in which.

DETAILED DESCRIPTION OF EMBODIMENTS

Figure 1:
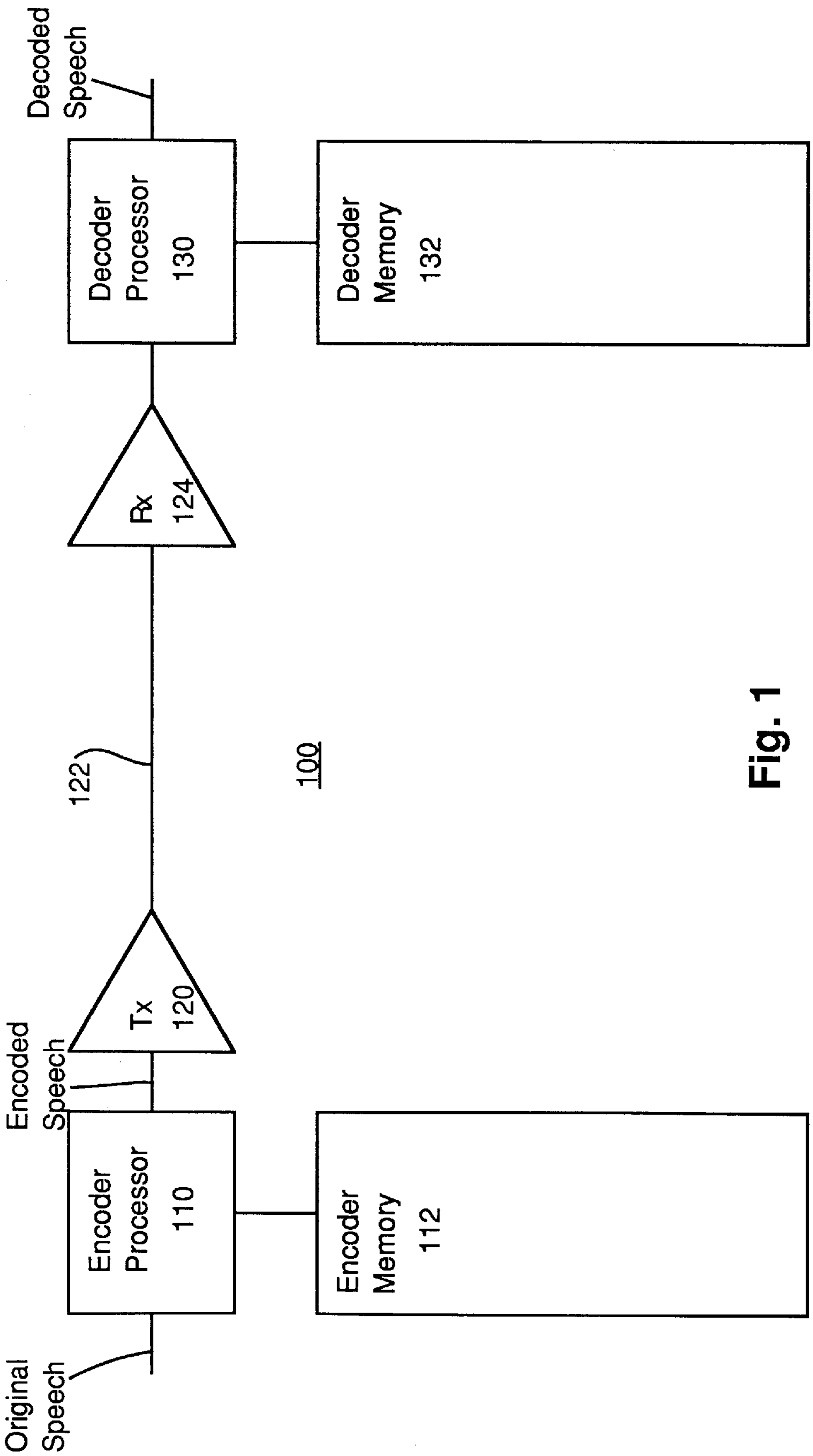
FIG. 1 is a block schematic diagram of a speech transmission system according to an embodiment of the invention.

FIG. 1 is a block schematic diagram of a speech transmission system 100 according to an embodiment of the invention. The system 100 comprises an encoder processor

110 connected to an encoder memory 112. The encoder memory 112 stores instructions for execution by the encoder processor 110 and data for execution of those instructions. The encoder processor 110 is connected to a transmitter 120 which is connected via a transmission medium 122 to a receiver 124. The receiver 124 is connected to a decoder processor 130 which is connected to decoder memory 132. The decoder memory 132 stores instructions for execution by the decoder processor 130 and data for execution of those instructions.

An input speech signal is coupled to the encoder processor 110 which executes instructions stored in the encoder memory 112 to encode the speech signal. The encoded speech signal is coupled to the transmitter 120 which transmits the encoded speech signal to the receiver 124 via the transmission medium 122. The receiver 124 couples the received encoded speech signal to the decoder processor 130 which executes instructions stored in the decoder memory 132 to reconstruct a replica of the input speech signal which is perceived by the human ear as being substantially similar to the input speech signal.

Figure 2A:
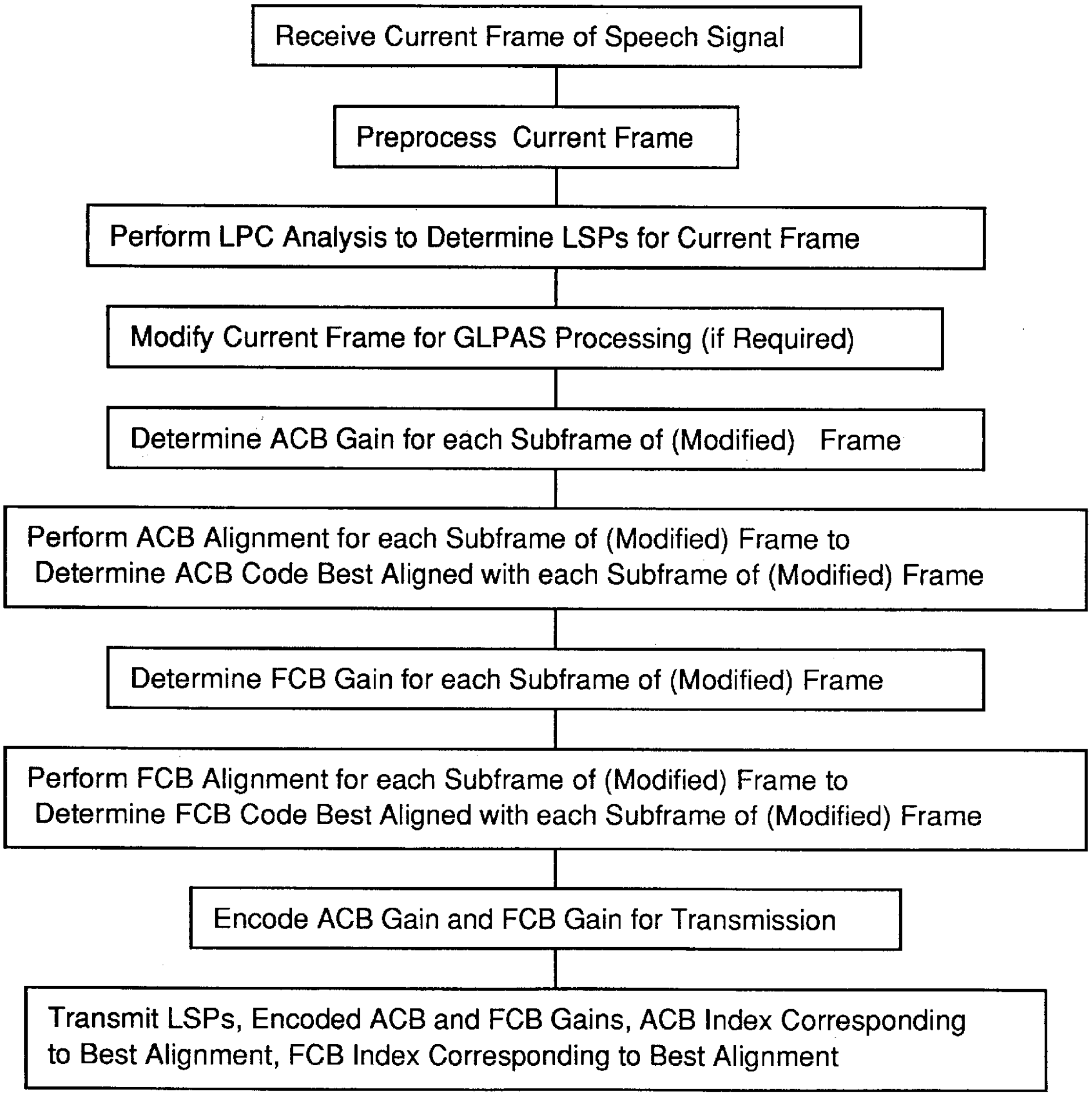
FIG. 2*a* is a flow chart illustrating a speech encoding method according to an embodiment of the invention.

FIG. 2*a* is a flow chart illustrating a speech encoding method according to an embodiment of the invention. The flow chart shows steps performed by the encoding processor 110 for each frame of a speech signal according to instructions and data stored in the encoder memory 112.

In particular, the encoder processor 110 receives a current frame of the speech signal, preprocesses the current frame of the speech signal (by high pass filtering, for example) and performs LPC analysis on the preprocessed frame to determine a set of LSPs for the current frame. The encoder processor 110 modifies the current frame (by smoothing the signal, for example) for GLPAS processing, and further processing is done on the modified current frame. (In the special case of LPAS processing, no such modification of the current frame is required, and further processing is performed on the unmodified frame.) The encoder processor 110 determines an ACB gain for each subframe of the modified frame and performs ACB alignment for each subframe of the modified frame to determine the ACB code which is "best aligned" with the excitation for each subframe of the current frame. (The determination of the "best alignment" weights misalignment of some signal parameters more heavily than misalignment of other signal parameters in recognition that some misalignments are more perceptible to human listeners than others.) The encoder processor 110 also determines a FCB gain for each subframe of the current frame and performs FCB alignment to determine the FCB code which is best aligned with the excitation for each subframe of the current frame. The ACB and FCB gains are encoded for transmission, and the LSPs, encoded ACB and FCB gains, the ACB index corresponding to the ACB code best aligned with each subframe of the current frame and the FCB index corresponding to the FCB code best aligned with each subframe of the current frame are forwarded to the transmitter 120 for transmission over the transmission medium 122 to the receiver 124.

Figure 2B:
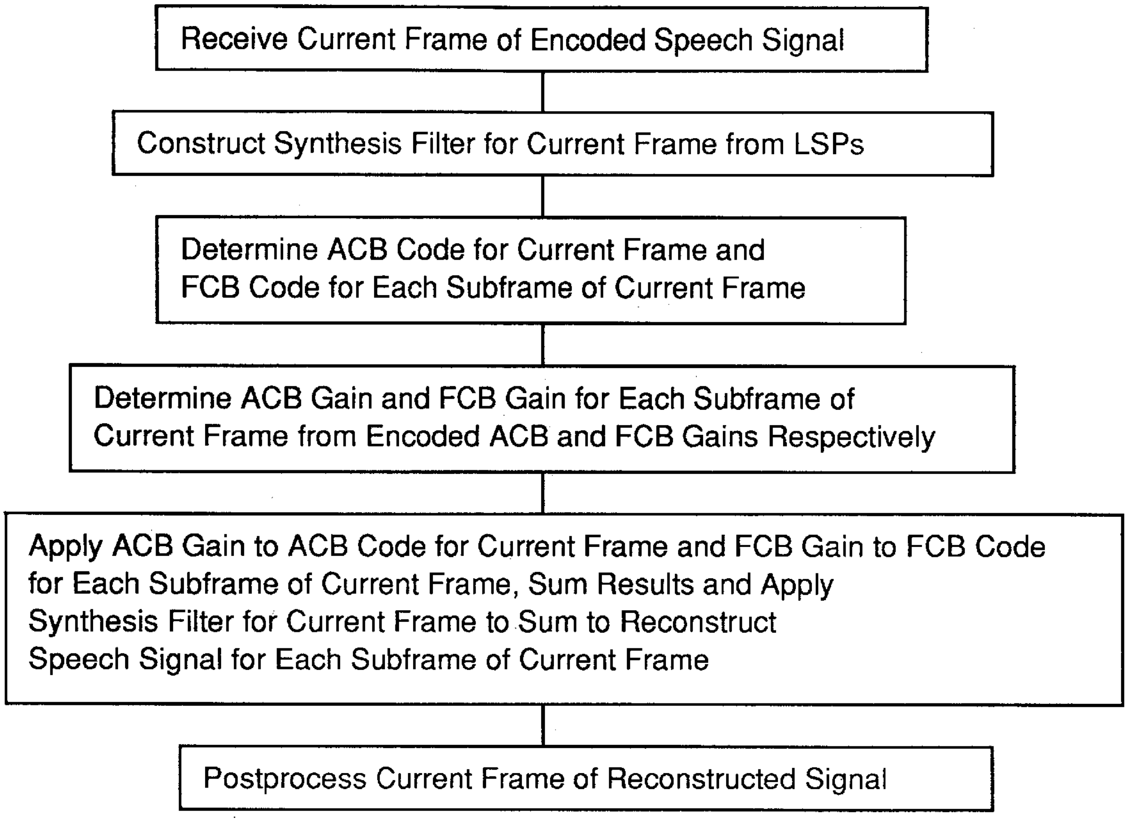
FIG. 2*b* is a flow chart illustrating a speech decoding method according to the embodiment of the invention.

FIG. 2*b* is a flow chart illustrating a speech decoding method according to the embodiment of the invention. The flow chart shows steps performed by the decoding processor 130 for each frame of a speech signal according to instructions and data stored in the decoder memory 132.

In particular, the decoding processor 130 receives a current frame of the encoded speech signal and executes instructions stored in the decoder memory 132 to construct a synthesis filter from the received LSPs. The decoding processor 110 determines the ACB code for the current frame and the FCB code for each subframe of the current frame from the received ACB index and the received FCB indices respectively. The ACB gain for the current frame and the FCB gain for each subframe of the current frame are determined from the encoded ACB and FCB gains. The ACB gain is applied to the ACB code for the current frame and the respective FCB gains are applied to the respective FCB codes for each subframe of the current frame, the results are summed and the synthesis filter is applied to the sum to reconstruct the speech signal for the current frame. The reconstructed speech signal is postprocessed to render it more subjectively acceptable to human listeners.

Figure 3A:
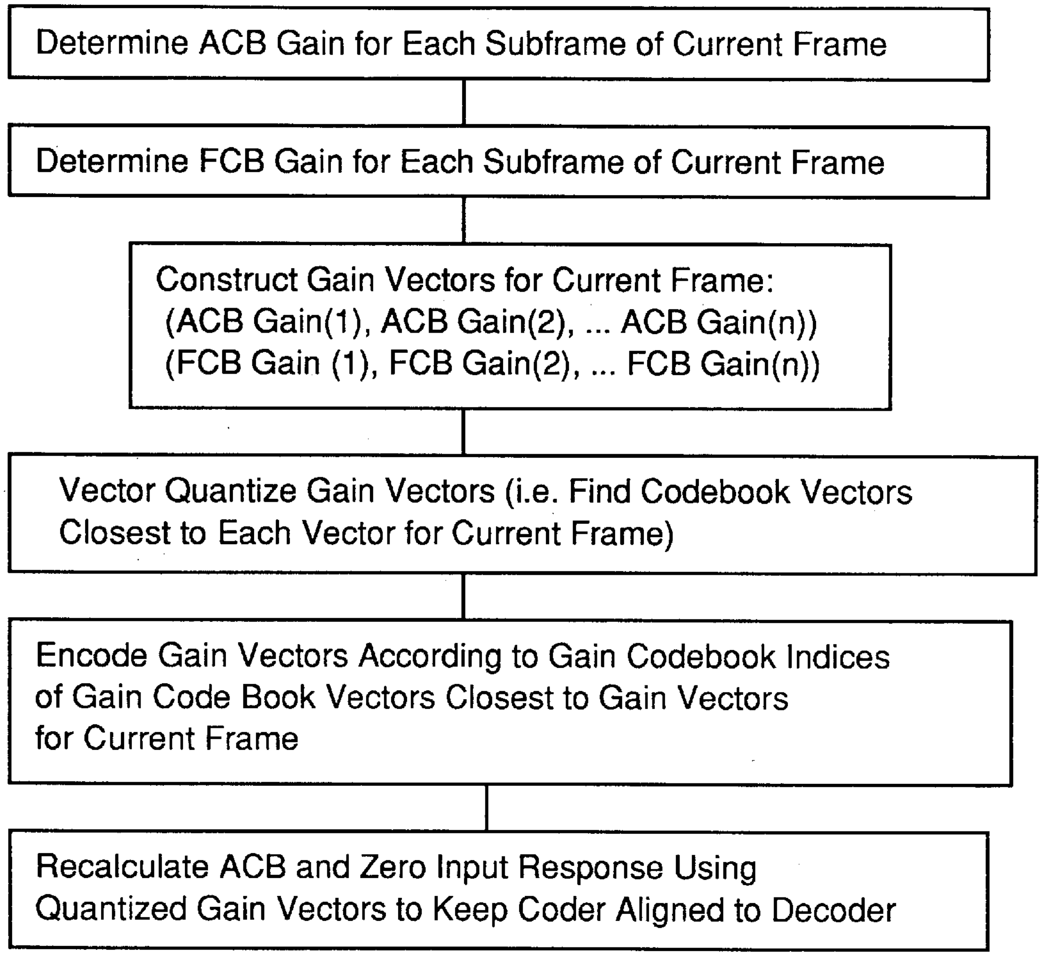
FIG. 3*a* is a flow chart illustrating a gain encoding step of FIG. 2*a* according to a first implementation of the speech encoding method according to an embodiment of the invention.

FIG. 3*a* is a flow chart illustrating a gain encoding step of FIG. 2*a* according to a first implementation of the speech encoding method according to an embodiment of the invention. In this implementation, the ACB gain and the FCB gains are determined for each subframe of the current frame using conventional methods. An ACB Gain Vector, {ACBG(1), . . . , ACBG(n)} and a FCB Gain Vector {FCBG(1), . . . , FCBG(n)} are constructed, where ACBG(n) is the ACB Gain of the nth subframe of the current frame and FCBG(n) is the FCB Gain of the nth subframe of the current frame. The ACB and FCB Gain Vectors are vector quantized by finding, in a gain codebook, vectors which are closest to the ACB and FCB Gain Vectors for the current frame, and the ACB and FCB Gain Vectors are encoded according to the gain codebook indices which correspond to the gain codebook vectors which are closest to the Gain Vectors for the current frame.

The quantized gain vectors are used to recalculate the Adaptive Codebook (ACB) parameters and the Zero Input Response of the Synthesis Filter. If this step is not performed, the coder will be operating based on an Adaptive Codebook and Zero Input Response derived from the unquantized gain vectors and the decoder will be operating based on a different Adapative Codebook and Zero Input Response derived from the quantized gain vectors, so that the speech signal reconstructed at the decoder will not faithfully model the input speech signal. As the decoder does not have access to the unquantized gain vectors, the coder must be realigned using the quantized gain vectors. This is simpler than running the full decoding process at the encoder processor 110 in order to realign the encoder parameters with the decoder parameters.

Figure 3B:
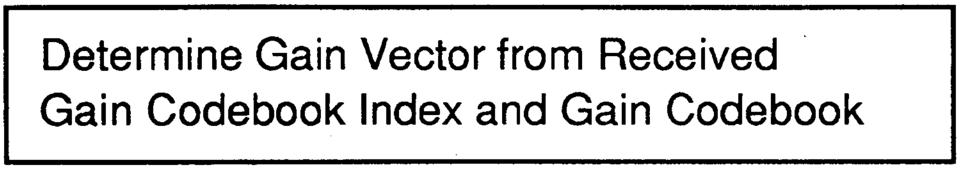
FIG. 3*b* is a flow chart illustrating a gain decoding step of FIG. 2*b* according to a first implementation of the speech decoding method according to the embodiment of the invention.

FIG. 3*b* is a flow chart illustrating a gain decoding step of FIG. 2*b* according to a first implementation of the speech decoding method according to the embodiment of the invention. In this implementation, the received ACB and FCB Gain Vector Indices are used in conjunction with the ACB and FCB Gain Codebooks to determine the ACB Gain for the current frame and the FCB Gain for each subframe of the current frame.

Figure 4A:
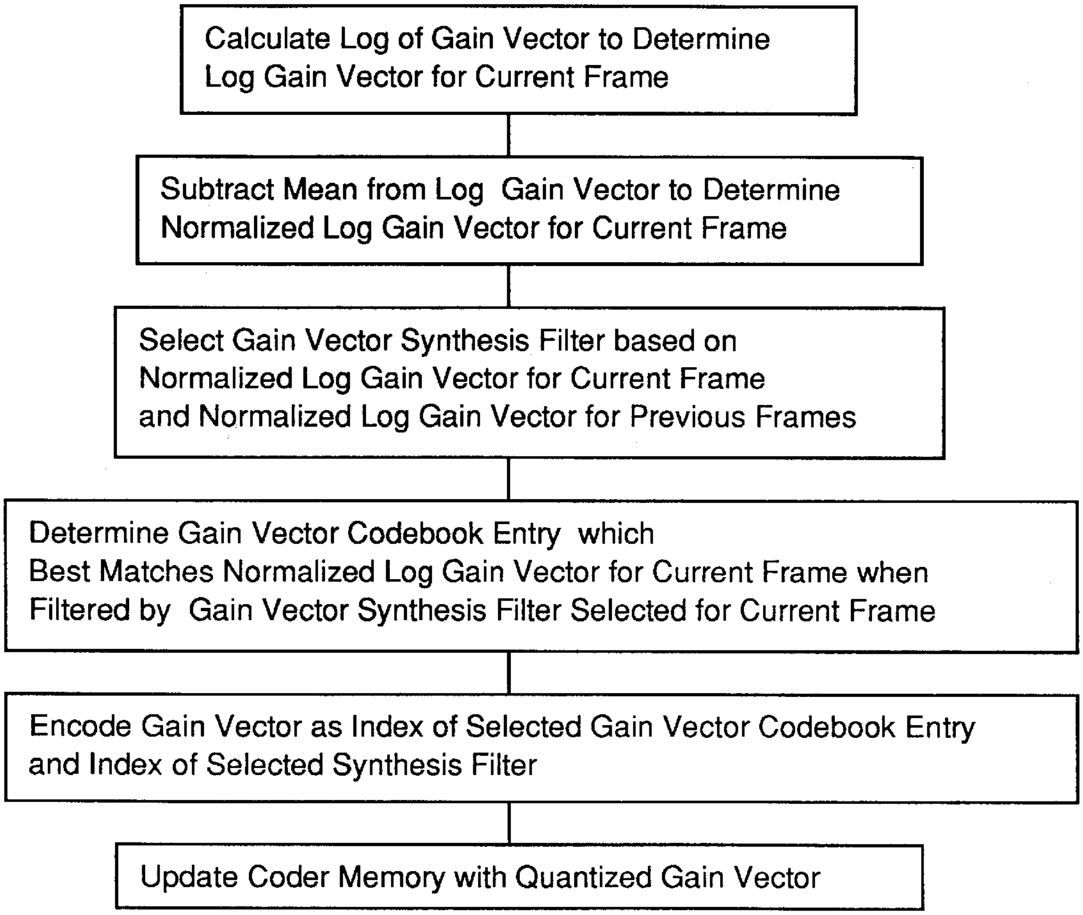
FIG. 4*a* is a flow chart illustrating a gain encoding step of FIG. 2*a* according to a second implementation of the speech encoding method according to an embodiment of the invention.

FIG. 4*a* is a flow chart illustrating a gain encoding step of FIG. 2*a* according to a second implementation of the speech encoding method according to an embodiment of the invention. This implementation is more complex computationally than the first implementation, but provides higher coding efficiency in at least some applications. In this implementation the ACB and FCB Gains for each frame are encoded as a Quantized Gain Vector having 2×n components where n is the number of subframes in each frame, and the factor 2 allows for separate ACB and FCB Gains for each subframe.

Referring to FIG. 4*a*, the Log of the Gain Vector is calculated to determine a Log Gain Vector for the current frame, and a fixed mean vector is subtracted from the Log Gain Vector to determine a Normalized Log Gain Vector for the current frame. (The log and mean fixed operators have been determined to provide good performance for ACB and FCB components in a particular application. In other applications, or for other gain components, other operators may be preferred.) A Gain Vector Synthesis Filter is selected from among a finite set of synthesis filters based on the Normalized Log Gain Vector for the current frame, and the Normalized Log Gain Vectors for one or more previous frames. Gain Vectors from a Gain Vector Codebook are passed through the selected Synthesis Filter and the results are compared to the Normalized Log Gain Vector for the current frame to determine the "best match", and the Gain Vector for the current frame is encoded as an index of the selected gain vector codebook entry together with an index designating the selected Synthesis Filter.

Figure 4B:
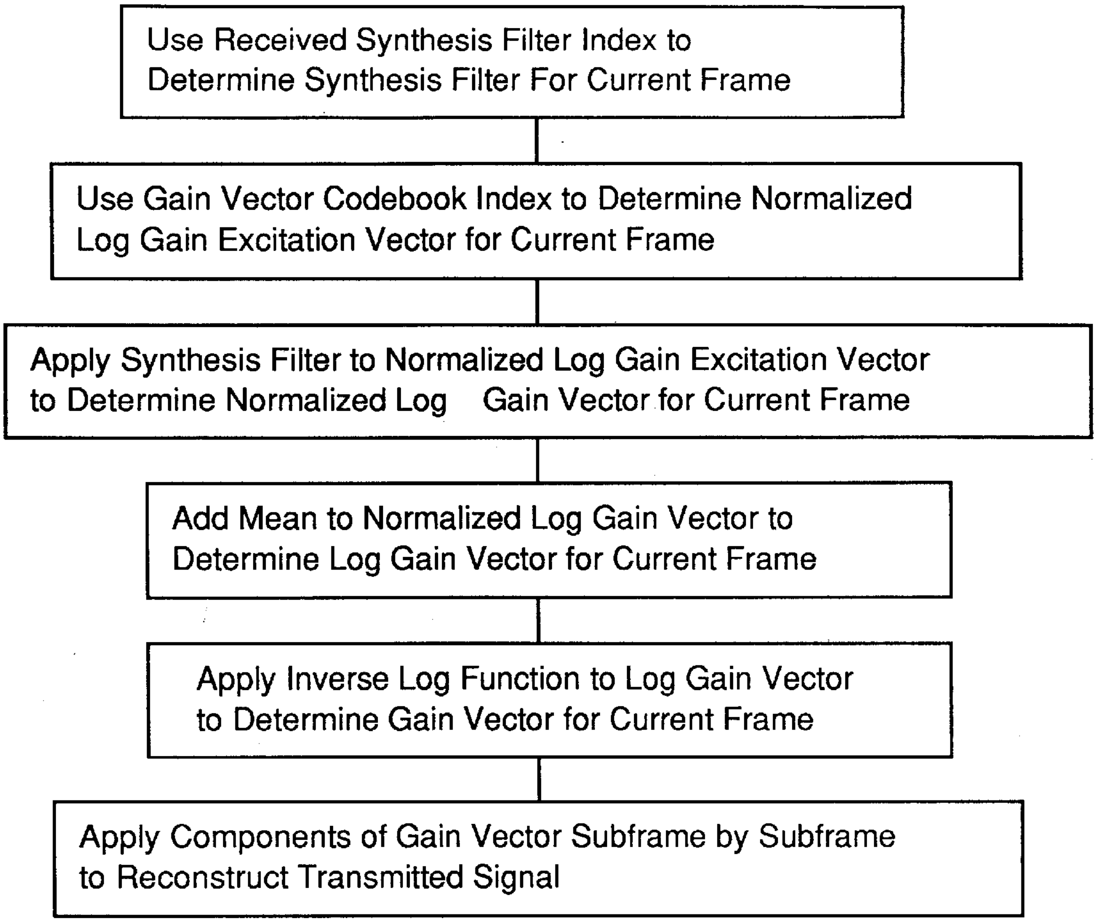
FIG. 4*b* is a flow chart illustrating a gain decoding step of FIG. 2*b* according to a second implementation of the speech decoding method according to the embodiment of the invention.

The encoder recalculates parameters like the Adaptive Codebook (ACB) parameters based on the quantized gain vector to keep the coder parameters aligned with the decoder parameters as discussed above in the description FIG. 4*b* is a flow chart illustrating a gain decoding step of FIG. 2*b* according to a second implementation of the speech decoding method according to the embodiment of the invention. The received Synthesis Filter index is used to determine the Synthesis Filter to be used for the current frame, and the Gain Vector Codebook index is used to a Normalized Log Gain Excitation Vector for the current frame. The Synthesis Filter is applied to the Normalized Log Gain Excitation Vector to determine a Normalized Log Gain Vector for the current frame. A fixed mean vector is added to the Normalized Log Gain Vector, and an inverse Log function is applied to the resulting Log Gain Vector to determine a Gain Vector for the current frame. The components of the Gain Vector are applied subframe by subframe to reconstruct a replica of the transmitted signal.

In the embodiment according to the second implementation, numerous techniques may be used to predict the Gain Vector of the current frame based on the Quantized Gain Vectors of previous subframes. For example, the prediction technique may based on a Moving Average (as in the IS-164 standard for example), an Auto-Regression or both, and may be used with or without LPC analysis.

Figure 5A:
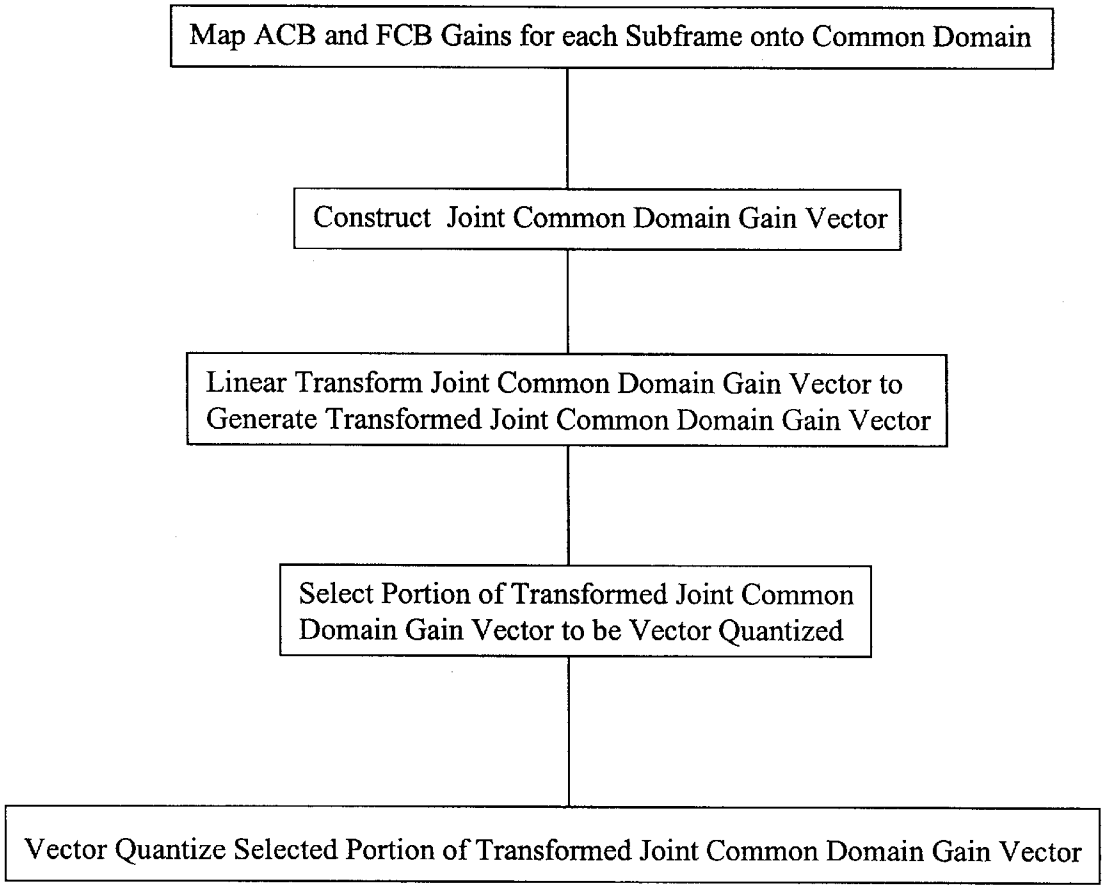
FIG. 5*a* is a flow chart illustrating a gain encoding step of FIG. 2*a* according to a third implementation of the speech encoding method according to an embodiment of the invention.
Figure 5B:
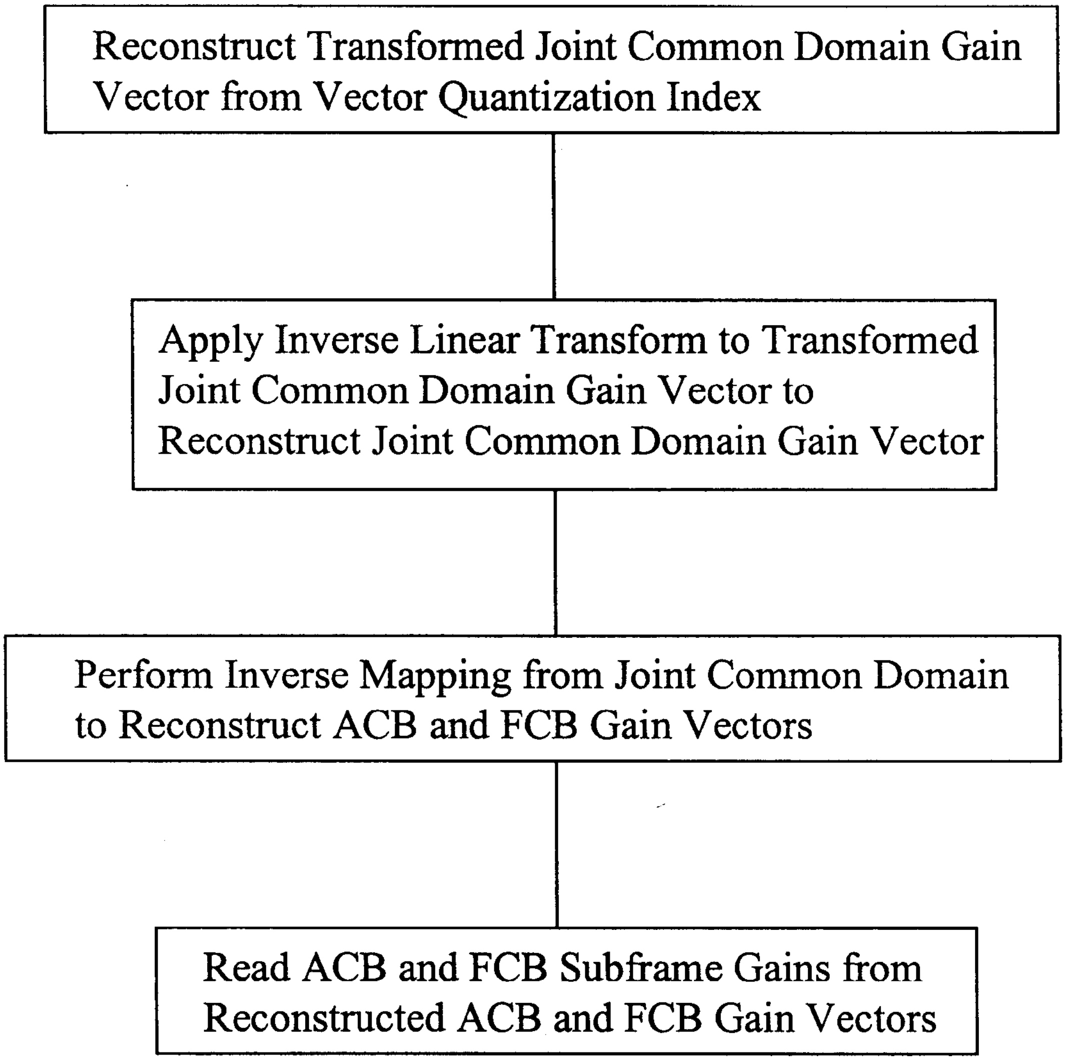
FIG. 5*b* is a flow chart illustrating a gain decoding step of FIG. 2*b* according to a third implementation of the speech decoding method according to an embodiment of the invention.
Figure 6A:
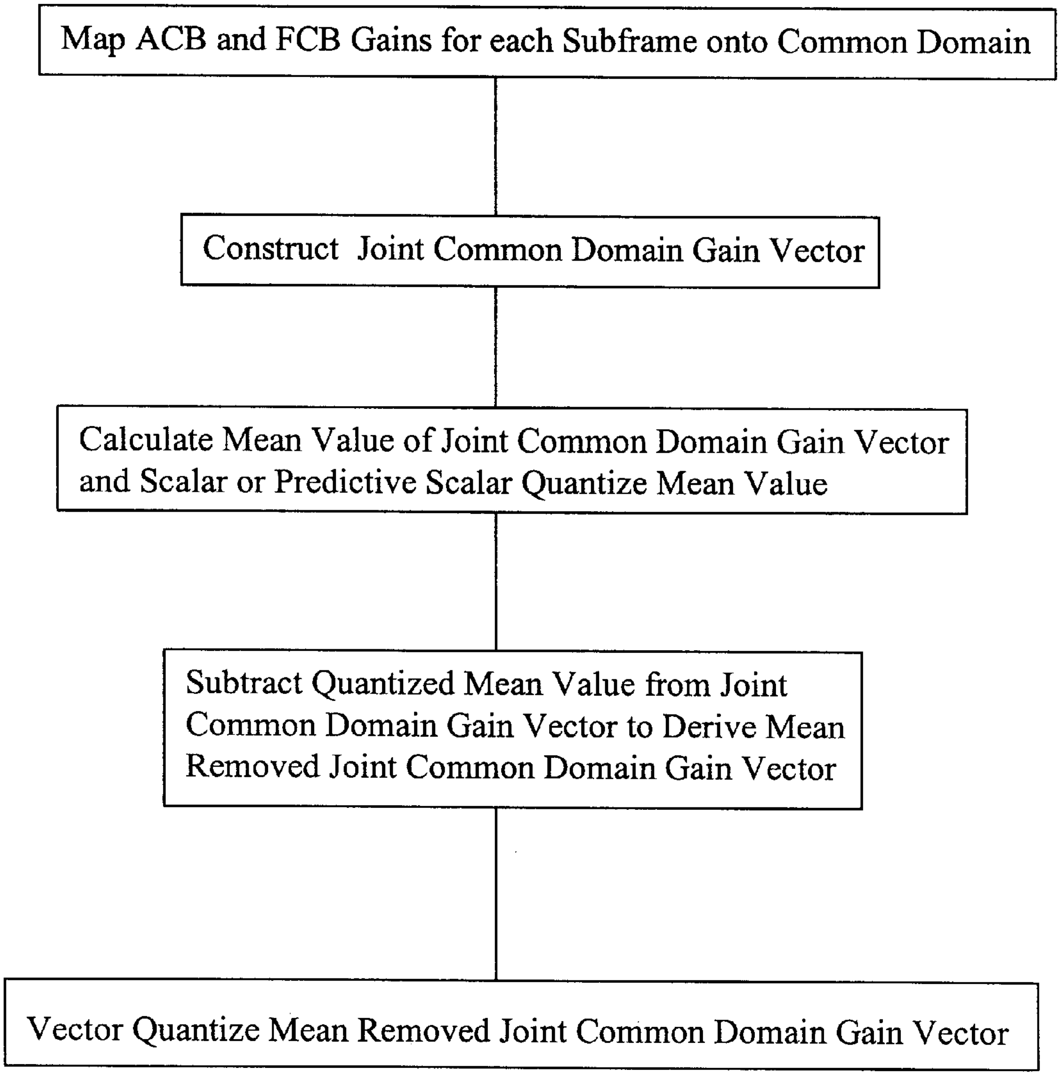
FIG. 6*a* is a flow chart illustrating a gain encoding step of FIG. 2*a* according to a fourth implementation of the speech encoding method according to an embodiment of the invention.
Figure 6B:
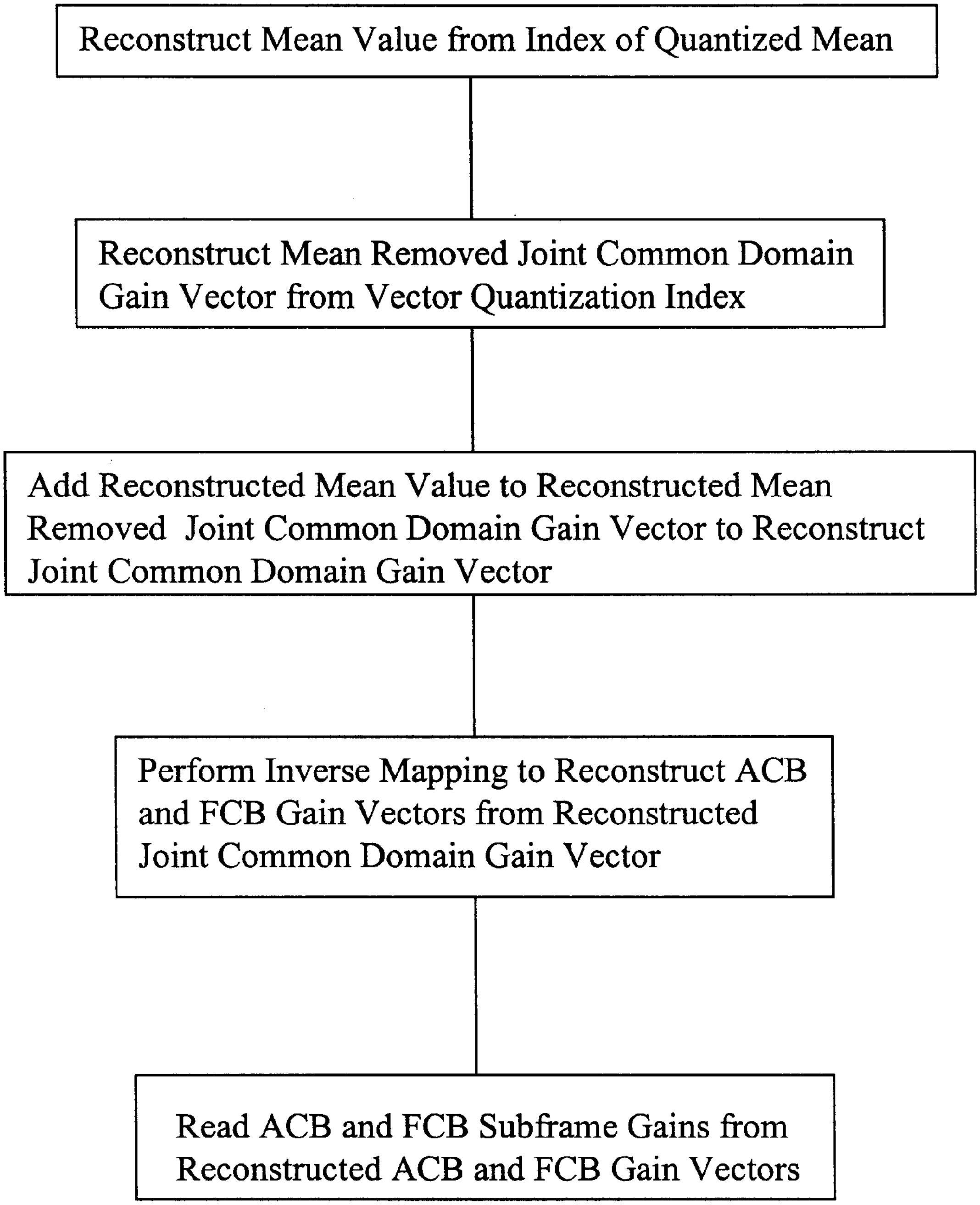
FIG. 6*b* is a flow chart illustrating a gain decoding step of FIG. 2*b* according to a fourth implementation of the speech decoding method according to an embodiment of the invention.
Figure 7A:
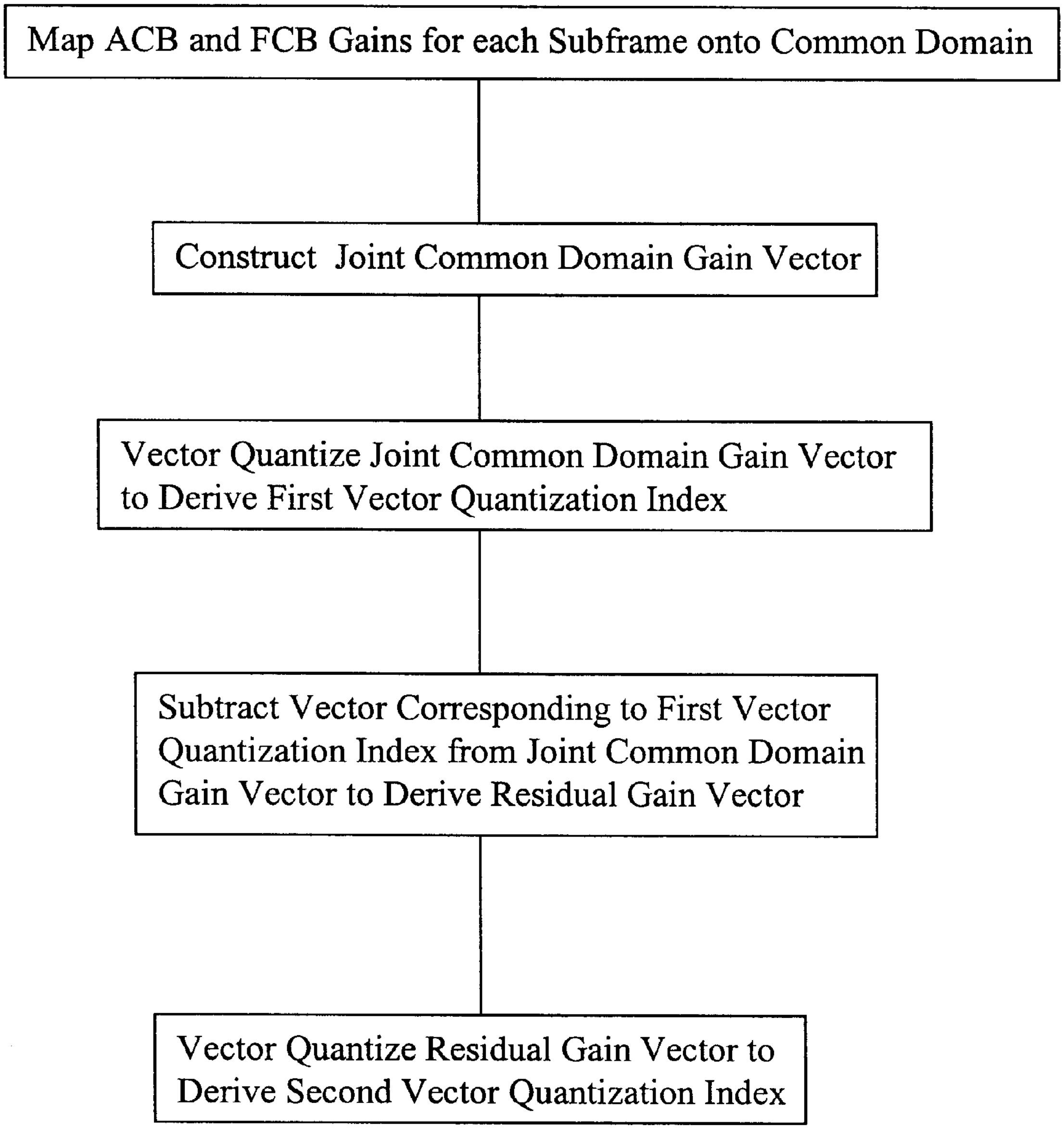
FIG. 7*a* is a flow chart illustrating a gain encoding step of FIG. 2*a* according to a fifth implementation of the speech encoding method according to an embodiment of the invention.
Figure 7B:
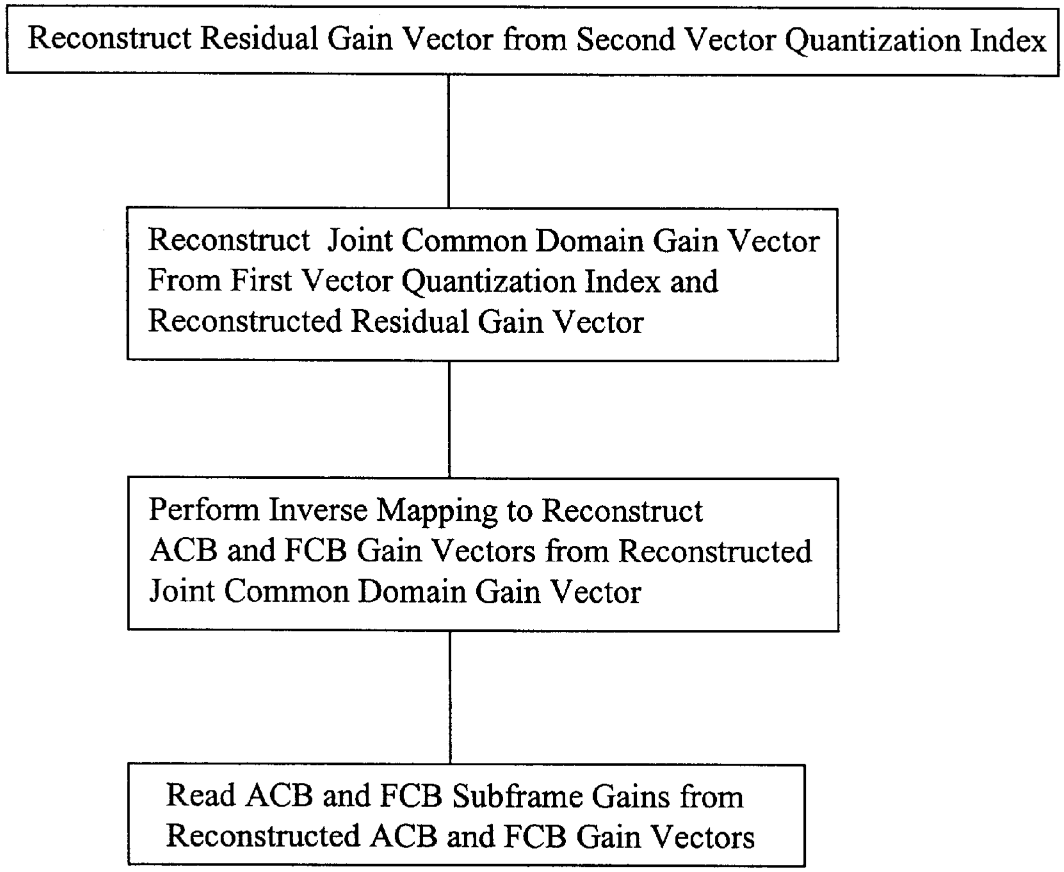
FIG. 7*b* is a flow chart illustrating a gain decoding step of FIG. 2*b* according to a fifth implementation of the speech decoding method according to an embodiment of the invention.

FIGS. 5*a*, 6*a* and 7*a* are flow charts illustrating gain encoding steps of FIG. 2*a* according to a third, fourth and fifth implementations of the speech encoding method. Corresponding gain decoding steps are shown in FIGS. 5*b*, 6*b* and 7*b*. These different implementations provide different tradeoffs between computational complexity, coding efficiency and performance.

Referring to FIG. 5*a*, in the third implementation mathematical functions are applied to the ACB and FCB gains for each subframe to map them onto ACB and FCB gain variables having similar dynamic ranges. For FCB gains confined to the range between 0 and 3000 and ACB gains confined to the range between 0 and 1.2, for example, the mapping could be as follows:

$$X=10*\log 10(x)-27;$$

$$Y=y*10*\log(3000)/1.2-27$$

Where x is the FCB gain, X is the FCB gain variable, y is the ACB gain, Y is the ACB gain variable and 27 is assumed to be the related signal mean for FCB gain during voiced speech. This step is described in the flowchart and in the rest of this specification as a mapping of the ACB and FCB gains onto a common domain. The resulting ACB and FCB gain variables are used to construct a joint common domain gain vector.

A linear transform is applied to the joint gain vector to generate a transformed joint common domain gain vector. The linear transform is selected so as to provide decorrelation and compacting of the transformed joint common domain gain vector. One suitable linear transform is the Discrete Cosine Transform. Due to the compacting property of the selected linear transform, some components of the transformed joint common domain vector are known to be very small for most frames. Consequently, the coding complexity can be reduced with limited impact on performance by selecting only that portion of the transformed joint common domain gain vector having components that are not small for most frames for vector quantization. The selected portion of the transformed joint common domain vector is vector quantized such that the gain parameters of the frame are encoded as the index of the codebook vector most closely matching the selected portion of the transformed joint common domain vector.

Referring to FIG. 5*b*, the gain parameters are decoded by reconstructing the transformed joint common domain gain vector from the vector quantization index. A linear transform, which is the inverse of the linear transform applied during encoding, is applied to the reconstructed transformed joint common domain gain vector to reconstruct the joint common domain gain vector. Mathematical functions which are the inverse of those used to map the ACB and FCB gains to a common domain during encoding, are applied to components of the joint common domain gain vector to reconstruct the ACB and FCB gain vectors. The reconstructed ACB and FCB subframe gains are read from the reconstructed ACB and FCB gain vectors.

Referring to FIG. 6*a*, in the fourth implementation the ACB and FCB gains are mapped onto a common domain and the resulting gain variables are used to construct a joint common domain gain vector as in the third implementation. The mean value of the components of the joint common domain gain vector is computed, and this mean value is scalar quantized using predictive or non-predictive scalar quantization. The quantized mean value is subtracted from the joint common domain gain vector to derive a mean removed joint common domain gain vector. The mean removed joint common domain gain vector is vector quantized and the gain parameters for the frame are encoded as the resulting vector quantization index and the quantized mean value.

Referring to FIG. 6*b*, the gain parameters are decoded by reconstructing the mean value from the index of the quantized mean, and reconstructing the mean removed joint common domain gain vector from the vector quantization index. The reconstructed mean value is added to the reconstructed mean removed joint common domain gain vector to reconstruct the joint common domain gain vector. Mathematical functions which are the inverse of those used to map the ACB and FCB gains to a common domain during encoding, are applied to components of the joint common domain gain vector to reconstruct the ACB and FCB gain vectors. The reconstructed ACB and FCB subframe gains are read from the reconstructed ACB and FCB gain vectors.

Referring to FIG. 7*a*, in the fifth implementation the ACB and FCB gains are mapped onto a common domain and the resulting gain variables are used to construct a joint common domain gain vector as in the third and fourth implementations. The joint common domain gain vector is vector quantized to derive a first quantization index. The vector corresponding to the first quantization index is subtracted from the joint common domain gain vector to derive a residual gain vector. The residual gain vector is vector quantized to derive and second vector quantization index. The gain parameters of the frame are encoded as the first and second vector quantization indices.

Referring to FIG. 7*b*, the gain parameters are decoded by adding the vectors corresponding to the first and second quantization indices to reconstruct the joint common domain gain vector. Mathematical functions which are the inverse of those used to map the ACB and FCB gains to a common domain during encoding, are applied to components of the joint common domain gain vector to reconstruct the ACB and FCB gain vectors. The reconstructed ACB and FCB subframe gains are read from the reconstructed ACB and FCB gain vectors.

In the fifth implementation described above, more than two stages of vector quantization could be used to provide different tradeoffs between accuracy and computational complexity.

The vector quantization technique used in the embodiments described above may be replaced with any suitable delayed decision quantization technique, including tree quantization and trellis quantization. The choice of technique will depend on the requirements of the application, including robustness to channel errors and other performance considerations. In many cases, tradeoffs between different aspects of performance require consideration.

The ACB and FCB gains may be vector quantized separately as described with respect to the first implementation or jointly as described with respect to the second, third, fourth and fifth implementations.

The techniques described above may also be applied to coding schemes in which different gain parameters or terminology are used. For example, the techniques described above may applied to "pitch gains" instead of ACB gains where such terminology is used.

In the description given above, vector quantization is described as a process in which a vector is encoded according to a codebook index which corresponds to the vector in the codebook which is "closest" to the vector being encoded. In simple implementations, the "closest" vector in the codebook may be the codebook vector which has the minimum mean square difference from the vector to be encoded. In more sophisticated implementations, different components of the vectors may be weighted differently in determining which codebook vector is "closest" to the vector to be encoded.

Alternatively, synthesized speech signals may be derived at the encoder using the gain codebook vectors, the synthesized speech signals may be compared to the speech signal to be encoded, and the gain codebook vector which provides the minimum difference between the synthesized speech signal, and the speech signal to be encoded may be selected as the "closest" gain codebook vector.

These and other modifications are within the scope of the invention as defined by the claims below.

Results of several implementations of the coding techniques described above show significant bit savings suitable for low bit rate coding. Rate-distortion measures were evaluated both objectively (SNR in the mean-removed-log domain) and subjectively (resulting decoded speech).

We claim:

1. A method of encoding a gain parameter in a generalized linear predictive analysis-by-synthesis coder, comprising:

determining a quantized frame gain parameter for each of a plurality of successive subframes of a frame of an encoded audio signal; and determining a quantized frame gain parameter for each frame of the encoded audio signal using a delayed decision quantizer operating on the subframe gain parameters.

2. A method as defined in claim 1, wherein the step of determining a quantized frame gain parameter comprises treating the subframe gain parameters as components of a gain vector and vector quantizing the gain vector to determine the quantized frame gain parameter.

3. A method as defined in claim 2, wherein the step of vector quantizing the gain vector comprises quantizing the gain vector by analysis-by-synthesis linear predictive vector quantization.

4. A method as defined in claim 3, wherein the step of vector quantizing the gain vector by analysis-by-synthesis linear predictive vector quantization comprises adaptation of a synthesis filter.

5. A method as defined in claim 3, wherein the step of vector quantizing the gain vector comprises application of auto-regressive predictive vector quantization.

6. A method as defined in claim 3, wherein the step of vector quantizing the gain vector comprises application of moving average predictive vector quantization.

7. A method as defined in claim 2, wherein the step of quantizing the gain vector comprises quantizing the gain vector by adaptive analysis-by-synthesis linear vector quantization.

8. A method as defined in claim 2, comprising determining multiple subframe gain parameters for each subframe, treating the subframe gain parameters as components of a gain vector and vector quantizing the gain vector to determine the quantized frame gain parameter.

9. A method as defined in claim 2, comprising determining a fixed codebook gain and an adaptive codebook gain for each subframe, treating the fixed codebook gains and adaptive codebook gains as components of a gain vector and a vector quantizing the gain vector to determine the quantized gain parameter.

10. A method as defined in claim 2, comprising determining a fixed codebook gain and a pitch gain for each subframe, treating the fixed codebook gains and long term predictor gains as components of a gain vector and vector quantizing the gain vector to determine the quantized gain parameter.

11. A method as defined in claim 2, wherein the step of vector quantizing the gain vector comprises applying a linear transform to the gain vector to generate a transformed gain vector and vector quantizing a selected portion of the transformed gain vector.

12. A method as defined in claim 11, wherein the step of applying a linear transform to the gain vector comprises applying a discrete cosine transform to the gain vector.

13. A method as defined in claim 2, wherein the step of vector quantizing the gain vector comprises calculating a mean value of the gain vector, scalar quantizing the mean value, subtracting the quantized mean value from the gain vector to generate a mean-removed gain vector and vector quantizing the mean-removed gain vector.

14. A method as defined in claim 13, wherein the step of scalar quantizing the mean value of the gain vector comprises predictive scalar quantizing the mean value of the gain vector.

15. A method as defined in claim 2, wherein the step of vector quantizing the gain vector comprises vector quantizing the gain vector to generate a first stage vector quantization index, subtracting a vector corresponding to the first stage vector quantization index from the gain vector to generate a residual gain vector and vector quantizing the residual gain vector to generate a second stage vector quantization index.

16. A method as defined in claim 2, wherein the step of vector quantizing the gain parameter comprises encoding the gain parameter as a gain codebook index corresponding to a gain codebook vector, said gain codebook vector providing a synthesized speech signal having a minimum difference from a speech signal to be encoded.

17. A method as defined in claim 1, wherein the step of determining a quantized frame gain parameter comprises applying tree quantization to the subframe gain parameters.

18. A method as defined in claim 1, wherein the step of determining a quantized frame gain parameter comprises applying trellis quantization to the subframe gain parameters.

19. A method as defined in claim 1, further comprising updating parameters of the coder using the quantized frame gain parameter.

20. A generalized linear predictive analysis-by-synthesis coder for encoding an audio signal, comprising means for encoding a gain parameter, said means comprising:

means for determining a subframe gain parameter for each of a plurality of successive subframes of a frame of an encoded audio signal; and delayed decision quantization means operable on the subframe gain parameters for determining a quantized frame gain parameter for each frame of the encoded audio signal.

21. A coder as defined in claim 20, wherein the delayed decision quantization means comprises a vector quantizer which treats the subframe gain parameters as components of a gain vector, vector quantizing the gain vector to determine the quantized frame gain parameter.

22. A coder as defined in claim 21, wherein the delayed decision quantization means comprises a quantizer selected from the class consisting of tree quantizers and trellis quantizers.

23. A transmission system, comprising:

a linear predictive analysis-by-synthesis coder comprising means for encoding a gain parameter, said means comprising means for determining a subframe gain parameter for each of a plurality of successive subframes of a frame of an encoded audio signal, and delayed decision quantization means operable on the subframe gain parameters for determining a quantized frame gain parameter for each frame of the digitally encoded audio signal;

a decoder comprising means for determining a quantized gain vector for the current frame of the encoded audio signal from a received gain vector codebook index, and means for applying respective components of the quantized gain vector to successive subframes of a signal synthesized at the decoder; and a transmission medium linking the coder to the decoder.

24. A method of decoding an encoded audio signal having a vector quantized gain parameter, components of a quantized gain vector for a frame of the encoded audio signal corresponding to gain parameters for each successive subframe of the frame, comprising:

determining a quantized gain vector for the current frame of the encoded audio signal from a received gain vector codebook index; and applying respective components of the quantized gain vector to successive subframes of an audio signal synthesized at the decoder.

25. A decoder for decoding an encoded audio signal having a vector quantized gain parameter, components of a quantized gain vector for a frame corresponding to gain parameters for successive subframes of the frame, the decoder comprising;

means for determining a quantized gain vector for the current frame of the encoded audio signal from a received gain vector codebook index; and means for applying respective components of the quantized gain vector to successive subframes of an audio signal synthesized at the decoder.

* * * * *